United States Patent [19]
Gray

[11] Patent Number: 6,108,323
[45] Date of Patent: Aug. 22, 2000

[54] METHOD AND SYSTEM FOR OPERATING A CDMA CELLULAR SYSTEM HAVING BEAMFORMING ANTENNAS

[75] Inventor: Steven D Gray, Carrollton, Tex.

[73] Assignee: Nokia Mobile Phones Limited, Espoo, Finland

[21] Appl. No.: 08/979,744

[22] Filed: Nov. 26, 1997

[51] Int. Cl.⁷ .................. H04B 7/216; H04B 1/38
[52] U.S. Cl. .............. 370/335; 370/342; 455/277.1; 455/562
[58] Field of Search ................ 370/335, 342; 375/200; 455/13.1, 33.1, 561, 562, 277.1, 277.2

[56] References Cited

U.S. PATENT DOCUMENTS

| | | | |
|---|---|---|---|
| 5,276,907 | 1/1994 | Meidan | 455/33.3 |
| 5,555,534 | 9/1996 | Maslak et al. | 367/135 |
| 5,596,333 | 1/1997 | Bruckert | 455/277.1 |
| 5,684,491 | 11/1997 | Newman et al. | 342/347 |
| 5,771,017 | 6/1998 | Dean et al. | 342/374 |
| 5,809,422 | 9/1998 | Raleigh et al. | 455/449 |
| 5,841,766 | 11/1998 | Dent et al. | 370/321 |
| 5,848,060 | 12/1998 | Dent | 370/281 |
| 5,894,598 | 4/1999 | Shoki | 455/562 |
| 5,907,816 | 5/1999 | Newman et al. | 455/562 |
| 5,953,325 | 9/1999 | Willars | 455/277.1 |

FOREIGN PATENT DOCUMENTS

| | | | |
|---|---|---|---|
| 94120490 | 7/1994 | European Pat. Off. | H01Q 7/36 |
| WO95/09490 | 4/1995 | WIPO | H04B 7/26 |
| WO96/37970 | 11/1996 | WIPO | H04B 1/76 |

*Primary Examiner*—Huy D. Vu
*Assistant Examiner*—Jasper Kwoh
*Attorney, Agent, or Firm*—Brian T. Rivers

[57] ABSTRACT

A method and system for operating a CDMA cellular telecommunications system having beamforming antennas in combination with other antenna access techniques. System capacity and demand on system resources are dynamically adjusted using beamforming antennas for some mobile stations, and other antenna access techniques for other mobile stations. Forward link channels on the beamforming and non-beamforming antennas are dynamically allocated among mobile stations depending upon resources available and the type of channel required by each mobile station. Forward link channels requiring a higher data rate, above a predetermined threshold, may be assigned to channels transmitted on beamformed antennas. In an embodiment of the invention, the cellular system includes beamformed and non-beamforming antennas.

26 Claims, 3 Drawing Sheets

METHOD AND SYSTEM FOR OPERATING A CDMA CELLULAR SYSTEM HAVING BEAMFORMING ANTENNAS

FIELD OF THE INVENTION

This invention relates to code division multiple access (CDMA) cellular telecommunications systems and, more particularly, to a method and system for operating a CDMA cellular telecommunications system utilizing beamforming antennas for space division multiple access (CDMA) in combination with other multiple access techniques.

BACKGROUND OF THE INVENTION

In the field of telecommunications, efforts have recently been directed towards developing advanced multiple access cellular systems. Multiple access refers to the method by which multiple users simultaneously gain access to the system. CDMA is a multiple access method, which is a direct sequence spread spectrum (DS-SS) technique and which has recently been implemented in commercial cellular radio systems. CDMA has several advantages over other methods of multiple access, such as time division multiple access (TDMA). For example, spectral efficiency and the simplicity of frequency planning are improved in CDMA. An example of a CDMA system is described in the publication, *Mobile Station-Base Station Compatibility Standard for Dual-Mode Wideband Spread Spectrum Cellular System*, TIA/EIA/IS-95, July 1993.

In CDMA, the narrowband data signal of a user is shifted to a relatively wide band by multiplication with a spreading code having a considerably broader band than the data signal. Bandwidths such as 1.25 MHz, 10 MHz and 25 MHz have been used in CDMA. As a result of the multiplication, the data signal spreads throughout the entire wideband. All users simultaneously transmit using the same frequency band. A separate unique spreading code is used over each transmission channel between a base station and user of a mobile station, and the signals of the different users can be distinguished from one another in the receivers based on the unique spreading codes.

Matched filters in the receivers are synchronized with a pilot signal, which may be identified based on the unique spreading code assigned to a channel carrying the pilot signal. A transmitted signal is restored in the receiver to the original band by multiplying it by the same spreading code that was used in the transmitter. In an ideal case, signals multiplied by some other spreading code do not correlate and are not restored to the narrow band. They appear thus as noise with respect to the desired signal. The spreading codes of the system are preferably selected in such a way that they are mutually orthogonal, i.e., they do not correlate with each other.

In a CDMA cellular radio system, such as an IS-95 system, a pilot channel is used in the transmission direction of the base station to subscriber equipment, i.e., in the downlink or forward link direction. The pilot channel is a signal that is transmitted with a specific spreading code in the same frequency band as the traffic channels. The pilot signal is distinguishable from the other channels based on the unique spreading code assigned to it. The pilot signal is monitored by all mobile stations within the coverage area of a base station and is used, for example, in power measurements and in the generation of a coherent phase reference. Each base station of the system transmits its own pilot signal, from which the subscriber equipment can distinguish the transmissions of different base stations from one another.

In a typical cellular environment, the signals between a base station and a mobile station propagate along several paths between the transmitter and the receiver. This multipath propagation is mainly due to the reflections of the signals from surrounding object surfaces. Signals which have propagated along different paths arrive at the receiver at different times due to their different transmission delays. The receiver generally utilized in a CDMA system is a multibranch receiver structure in which each branch is synchronized with a signal component which has been propagated along a separate individual path. Each branch is an independent receiver element, the function of which is to compose and demodulate one received signal component. In a conventional CDMA receiver, the signals of the different receiver elements are combined to generate a signal of good quality.

CDMA systems can also apply a soft handover wherein a mobile station may simultaneously communicate with several base stations by utilizing the multibranch receiver's ability to simultaneously decode multiple channels. The connection quality of the mobile station remains high during the handover and the user does not notice a break in the connection.

Typically, a CDMA signal is transmitted in an omnidirectional pattern within a normal cell sector of up to 360 degrees. Commonly, three sectored cells are used where the omnidirectional transmission is over 120 degrees, and interference caused by other transmissions within the desired channel effectively appears in the receiver as noise that is evenly distributed. This is also true when a signal is examined in an angular domain, based to the incoming direction of the signals detected in the receivers. The interference caused by the other channels with a channel also appears in the receiver as distributed in the angular domain, i.e., the interference is rather evenly distributed across the different incoming directions.

A capacity increasing multiple access technique called space division multiple access (SDMA) has recently been developed. This is performed in such a way that the beams of the transmitter antennas at the base station are adjusted to the desired directions according to the location of the mobile stations. For this purpose, the system uses adaptive antenna groups, i.e., phased antennas, and the processing of the received signal by means of which the mobile stations are tracked.

The use of the SDMA and beamforming antennas in connection with CDMA provides several advantages over conventional omnidirectional antennas. SDMA has been proposed as a method to increase the capacity of proposed IS-95 3rd generation systems forward links. Using beamforming antennas on only the forward link allows capacity increase without added mobile complexity. This may, however, result in a resource cost at the base station if the base station tracks the mobile station position. The complexity increase is because multipath searching must be performed in the dimensions (i.e., time and space) and antenna patterns must be changed based upon positional information on the mobile stations. Other changes required to support beamforming antennas on the forward link include the addition of a pilot signal specific to the beamformed antenna called an auxiliary pilot. This auxiliary pilot signal can be provided by imbedding reference symbols in the traffic channel or broadcasting a known channel in parallel to the traffic channel. The increase in capacity of a CDMA cellular system provided by implementing beamforming antennas clearly has a cost.

OBJECT OF THE INVENTION

It is, therefore, an object of the invention to provide an improved method and system for operating a CDMA cellular telecommunications system having beamforming antennas.

It is another object of the invention to provide a method and system for operating a CDMA cellular telecommunications system having beamforming antennas to allow system capacity and demand on system resources to be dynamically adjusted.

It is a further object of this invention to provide a method and system for operating a CDMA cellular telecommunications system having beamforming antennas in combination with conventional antenna access techniques, and to allow system capacity and demand on system resources to be dynamically adjusted according to system traffic requirements.

SUMMARY OF THE INVENTION

The present invention provides an improved method and system for operating a CDMA cellular telecommunications system having beamforming antennas in combination with other antenna access techniques. The other antenna access techniques may be techniques that offer less capacity than beamforming techniques but place less demand on system resources. The method and system allows system capacity and demand on system resources to be dynamically adjusted. The adjustments of system capacity and demand on system resources may be made according to system traffic requirements and available resources. The method and system may be implemented in a CDMA cellular system having beamforming antennas in combination with other antenna access techniques, with system capacity and demand on system resources being dynamically adjusted using beamforming antennas for some mobile stations and other antenna access techniques for other mobile stations. The other antenna access techniques may use omnidirectional antennas. The omnidirectional antennas may be antennas that transmit omnidirectionally within the sector of a cell, i.e., transmit over the whole area of the sector of a cell. The allocation among the mobile stations between beamforming antennas and the other antenna access techniques may be made based on the type of traffic channel required by each mobile station.

In an embodiment of the invention, the method and system is implemented in a CDMA cellular system having both beamforming antennas and omnidirectional antennas on the forward link with one or more base stations of the system. Each traffic channel transmit from a beamforming antenna of a base station has an associated pilot channel with both the traffic channel and pilot channel transmitted from the same beamforming antenna. Each base station also has at least one omnidirectional pilot channel and omnidirectional traffic channel. Also, each base station has at least one omnidirectional access channel and paging channel. Mobile stations requiring forward link channels for a first type of service may be assigned to traffic channels transmitted on the beamforming antennas, while mobile stations requiring forward link channels for a second type of service may be assigned to traffic channels transmitted by the omnidirectional antennas depending on the availability of system resources. The first type of service may require high speed data transmission and the second type of service may require low speed data transmission, such as speech data transmission.

In the embodiment of the invention, a mobile station transmits a request for system access on the omnidirectional access channel. The mobile station receives a paging channel assignment and monitors the paging channel. When a call is initiated, a determination is made as to whether the forward link channel will be transmitted from a beamforming antenna or from an omnidirectional antenna. The determination is made in a base station controller based on the data rate requirements of the forward link channel and resources available to implement the traffic channel on a beamforming antenna. If the call is to be carried on an omnidirectional antenna, the mobile station is assigned an omnidirectional traffic channel for the forward link and the call is begun. If the call is to be carried on a beamformed or auxiliary traffic channel, a message assigning an auxiliary traffic channel is transmitted to the mobile station. The message includes data on an assigned auxiliary traffic channel and its associated auxiliary pilot channel. The mobile station then searches and synchronizes to the associated auxiliary pilot channel. The mobile station then transmits a control channel message indicating any timing difference between the omnidirectional pilot and the auxiliary pilot to the base station. The base station then adjusts the timing of the assigned auxiliary traffic channel based upon the control channel message.

The mobile station demodulates the assigned traffic channel until the base station transmits a control message informing the mobile to switch to receiving on the other type traffic channel, or the call ends. The determination to transfer between the traffic channel transmitted from a beamforming antenna and the traffic channel transmitted from an omnidirectional antenna may be made based upon the data rate requirements on the forward link for that call and the amount of available resources to provide beamforming antennas in the base station coverage area. For example, the mobile station may be transferred from a beamformed traffic channel to an omnidirectional traffic channel if another mobile station having a higher priority call needs a beamformed channel and resources allow only one or the other to use a beamformed antenna.

BRIEF DESCRIPTION OF THE DRAWINGS

The above set forth and other features of the invention are made more apparent in the ensuing Detailed Description of the Invention when read in conjunction with the attached drawings, wherein.

DETAILED DESCRIPTION OF THE INVENTION

Figure 1:
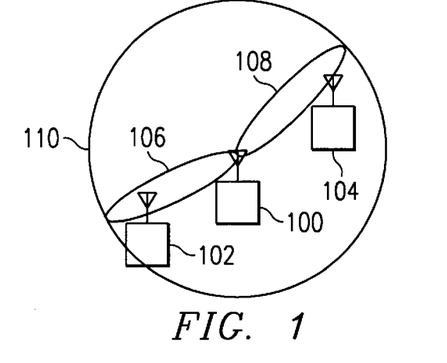
FIG. 1 illustrates forward link transmission patterns utilized in an embodiment of the invention.

Referring now to FIG. 1, therein are illustrated forward link transmission patterns utilized in an embodiment of the invention. Base station 100 is shown transmitting beamformed transmission patterns 106 and 108 to mobile stations 102 and 104, respectively. Base station 100 may also transmit in an omnidirectional pattern that is illustrated by omnidirectional transmission pattern 110. Transmission patterns 106, 108 and 110 may be for transmission of any type of forward link channel. In an embodiment of the invention, pilot channels and traffic channels may be transmitted in beamformed or omnidirectional transmission patterns. Pilot channels transmit as beamformed transmissions may be termed auxiliary change pilots, and may be associated with a specific traffic channel that is transmitted as a beamformed transmission. In the embodiment, the method and system of the invention is utilized to balance the beamformed antenna capacity improvement against the system resource demands caused by using the beamformed antennas.

The beamforming of the forward link transmission may be accomplished by a method such as that disclosed in PCT Application WO 96/37970, Method for Transmitting Pilot Channels and a Cellular Radio System, published Nov. 28, 1996. The method and system of the present invention allows cellular systems such as that disclosed in WO 96/37970 to operate in a more efficient manner.

Figure 2:
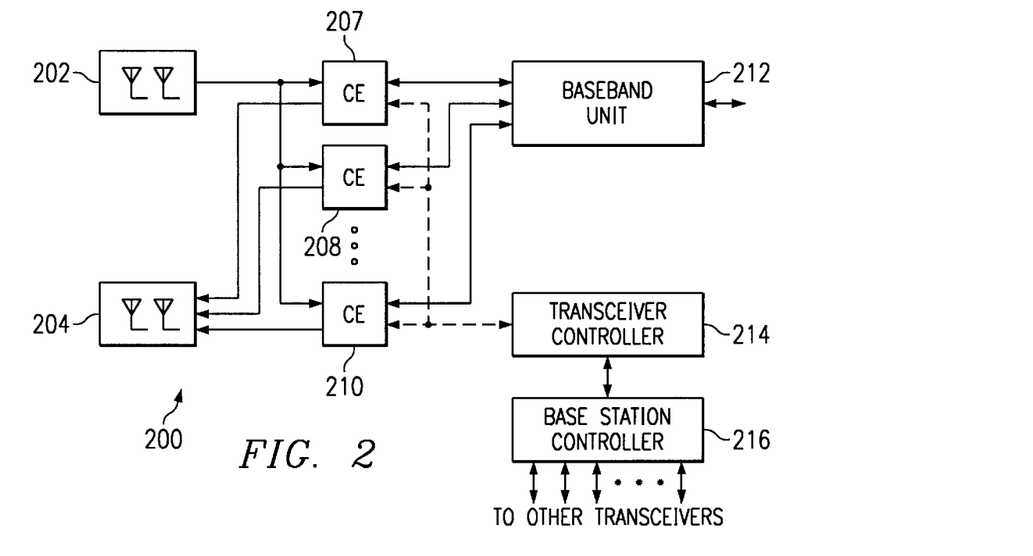
FIG. 2 is a block diagram of a base station transmitter according to an embodiment of the invention.

Referring now to FIG. 2, therein is a block diagram of a base station transceiver 200 according to an embodiment of the invention. Transceiver 200 may be implemented in base station 100. Transceiver 200 comprises antenna group 202 and 204 consisting of L separate antenna elements, channel elements 207, 208, 210, baseband unit 212, and transceiver controller 214. The antenna group 202, 204 may be linear, planar (two-dimensional) or omnidirectional. Transceiver controller 214 controls the operation of transceiver 200, such as allocation of the channel units to different mobile stations according to control signals from the base station controller 216. Base station controller 216 includes hardware and/or software for implementing the method and apparatus of the invention by determining the appropriate assignments and allocation of omnidirectional or beamformed channels to mobile stations within the base station coverage area, based on parameters such as available capacity, required resources and available system hardware resources. Base station controller 216 may also control other base station transceivers, depending on the number of transceivers included in base station 100.

In an embodiment of the invention, the antenna group 202 receives a multipath-propagated signal that is delayed on paths in several different directions from a mobile station at each of the L elements. Antenna group 202 performs the preamplification, converts the signal into an intermediate frequency and digitizes all L signals. The obtained L digital complex I, Q samples are supplied in channel elements 207, 208, 210.

Each active mobile station communicating with the base station is serviced by one channel element, which performs digital signal processing both on the received signal and on the signal to be transmitted, as will be described in greater detail below. Each channel element comprises a ($\alpha$, $\tau$) receiver and a corresponding transmitter. The digital shaping functions of the antenna beam, realized by means of the signal phasing, are performed in a channel element both in the transmission direction and in the direction of reception. The system resources used to perform these functions may be software and hardware resources unique to each channel element or shared system software and hardware resources.

For reception, a channel element filters the signal on the angle-space domain, demodulates the received signal components and combines them in a diversity combiner and then decodes the signal that has been received and combined. The obtained user data bits are supplied further to baseband unit 212, which forwards them to other parts of the network For transmission, user data bits arrive from the other parts of the network to the baseband unit 212, which forwards them to the correct channel element 207, 208, 210, where they are encoded, modulated by a spreading code and adjusted to the phasing of the signal to be transmitted. The phasing of the signal determines the directions of the antenna beams to be transmitted. The obtained L signals are supplied to each of the L elements of the antenna group 204. The reception and transmission antenna groups 202, 204 may be either separate or implemented by means of the same physical antenna group where the directions of transmission and reception are separated with suitable duplex filtration. In the transmission antenna group 204, the signals that have arrived from each channel element are converted into analog form, transferred to a radio frequency and transmitted via the appropriate antenna elements.

Figure 3:
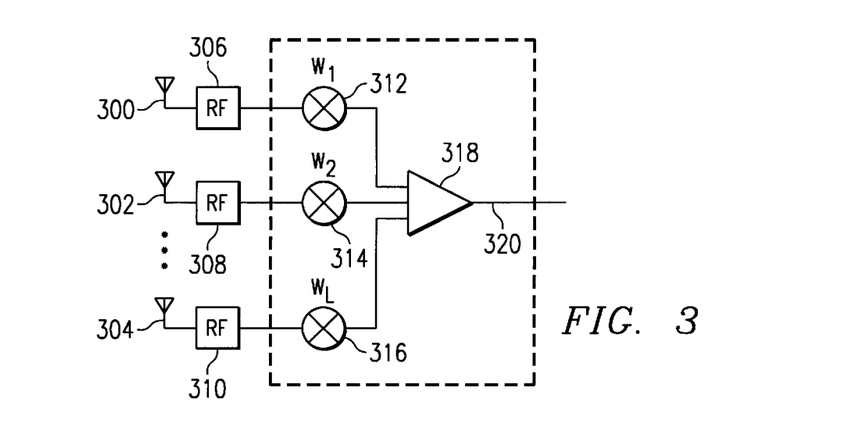
FIG. 3 is a block diagram of an adaptive antenna group of the base station transmitter of FIG. 2.

Transceiver 200 utilizes an adaptive antenna group, which is an antenna group consisting of several different elements. FIG. 3 illustrates a possible implementation of an adaptive antenna group 202 or 204, which may be used in the embodiment of the invention. The antenna group comprises L antenna elements 300, 302, 304, which may be, for example, omnidirectional antennas. Each antenna element is connected to radio frequency parts 306, 308, 310, multipliers 312, 314 and 316 and adder 318. For reception, the received signal is converted at antenna element 202 into an intermediate frequency and the signal (I, Q) components are sampled. The obtained complex samples are then multiplied by the corresponding complex weighting coefficients $w_1$, wherein i=1, . . . , L, in multipliers 312, 314, 316. The samples at multiplier outputs 322, 324, 326 that have been multiplied are then sent via adder 318 to other parts of the receiver.

The complex weighting coefficients $w_i$ are selected according to an algorithm, which is usually adaptive, in such a way that an antenna pattern of the desired shape is achieved. This method of shaping the received signals is digital phasing of the signal, since it is performed on a signal digitized on the baseband, but due to this shaping the received signal antenna gain can be oriented in the desired directions. An antenna group as such may comprise either directional or omnidirectional antenna elements. Phasing the signal obtained from the different antennas and combining the phased signals produces beams in the desired directions. A corresponding treatment can also be performed on the signal to be transmitted, whereby a desired radiation pattern can be achieved.

Figure 4:
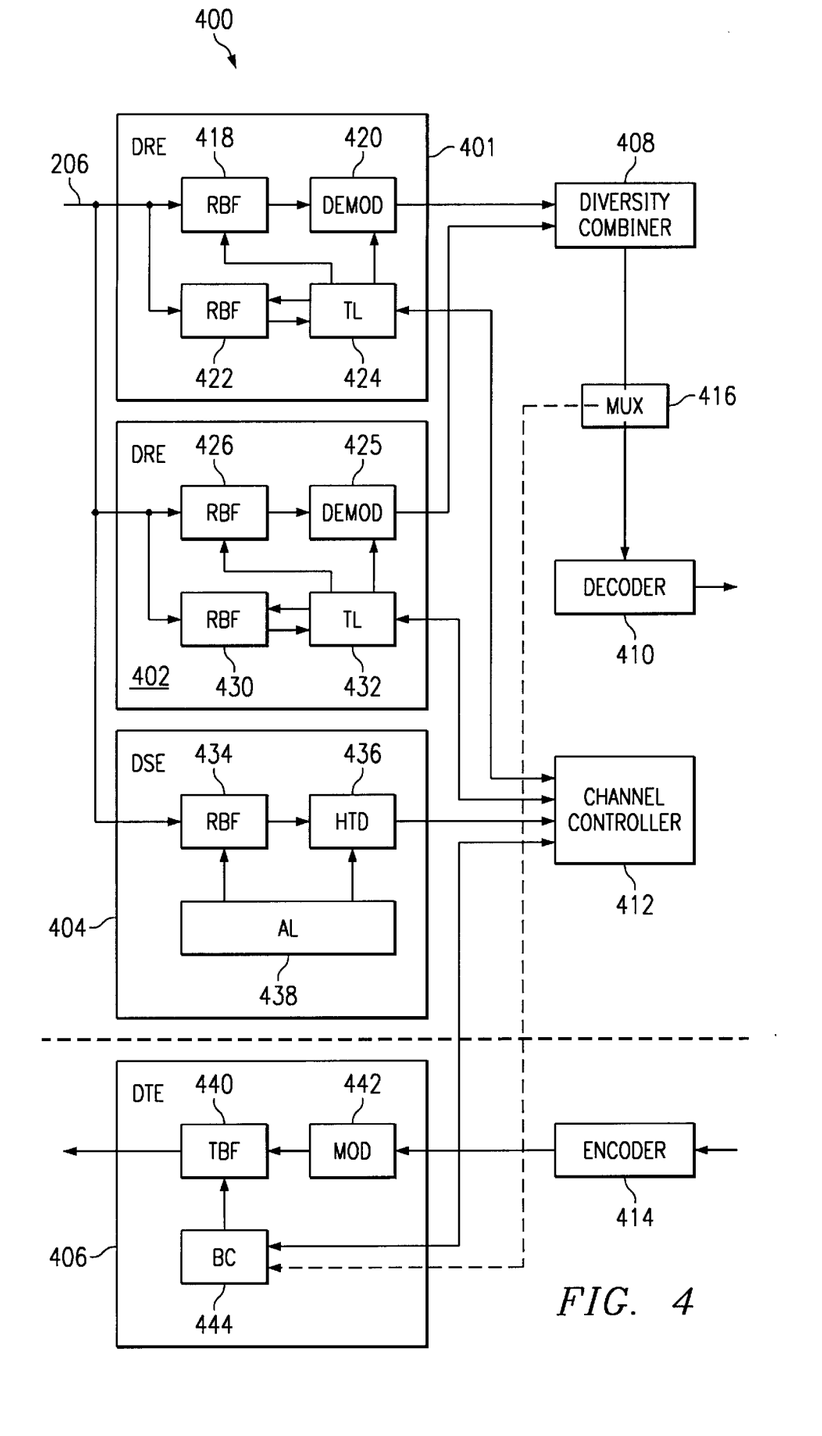
FIG. 4 is a block diagram of a channel control element of the base station transmitter of FIG. 2.

Referring now to FIG. 4, therein is a block diagram of a channel control element of the base station transceiver 200 of FIG. 2. The channel element 400 comprises at least one digital receiver unit (DRE) 401, 402, at least one searcher unit (DSE) 404, a diversity combiner 408, the input of which comprises a signal from the receiver units, a decoder 410, to which a signal from the diversity combiner 408 is input, and channel controller 412. The L digital complex I, Q samples from the antenna group are supplied to the input 450 of all the digital receiver units 400, 402 and searcher unit 404. Channel element 400 may also include an encoder 414 and a digital transmission unit (DTE) 406. Searcher unit 404 searches for the desired signal components from the received signal. Searcher unit 404 continuously monitors the receiver signal in the ($\alpha$, $\tau$) domain and searches for useful signal components and gives their parameters, i.e., the angle of arrival (AoA) and the delay profile, to the channel controller 412, which allocates a required number of receiver units for demodulating the best components. The receiver according to the invention can also be implemented in such a way that channel element 400 does not comprise separate control means 412, so searcher unit 404 forwards the information concerning the monitored signal components directly to the digital receiver units 400, 402.

Searcher unit 404 comprises phasing means (RBF) 434 for phasing the signal supplied from the radio-frequency parts of the antenna group, and measuring means (HTD) 436 for detecting whether the signal obtained from the output of the phasing means 434 comprises a signal component received with the given delay and for measuring the quality of this signal component. The searcher unit further comprises control means (AL) 438 for controlling the aforementioned phasing means 434 and the measuring means 436 in such a way that the incoming directions and delays of the received signal can be measured.

The phasing means 434 can be implemented, for example, with equipment performing the multiplication of a signal with complex coefficients $w_i$ (I=1, . . . L). From the multiplication result, it is possible to determine the angle of arrival of the signal because the signal will be visibly amplified in the output signal of the phasing means. Each combination of the coefficients corresponds to a certain combination of antenna beams, as described above.

The phasing means 434 is controlled by the control means 438 so that all the essential incoming directions for the signal can be examined.

The output of the phasing means 434 thus shows a signal that corresponds to the signal received from a given direction on the basis of the control of the control means 438. The measuring means 436 performs a measurement with different delays on a signal output from phasing means 434. The purpose of the measurement is to detect the signal components that have different delays. The delay to be measured at each delay time is set with the aforementioned control means 438. In the measuring means 436, the signal situated at the input of the means is subjected to despreading, measurement of the complex signal energy and squaring of the energy, for example, over the coherence time of the channel, and comparison of the obtained measurement result with the given threshold value. The parameters of the measured signal components having a strength exceeding the given threshold value, i.e., the angle of arrival, delay and power, are provided to the channel controller 412.

The control means 438 corresponds to a synchronization loop provided in the searcher branch of a conventional rake receiver operating in a modified manner. The search for the desired signal components from the $(\alpha, \tau)$ domain can be implemented in alternative ways in control means 438. The measurement of the signal power may also be replaced with another measurement of the signal quality.

The digitized signal received by the antenna group can be phased in the phasing means 434 step by step, in such a way that the direction angle of the greatest gain is changed through angle intervals. From among the possible incoming directions, one selects a representative group of angles of arrival $\alpha_i$ which are situated at desired angle intervals from one another, and each incoming direction is subjected to several energy measurements at different delay values, whereby a delay profile $\tau_k$ is obtained for the incoming directions.

Another way is to direct the measuring means 436 to first measure the delay profile $\tau_k$ of the received signal, for example, with a nondirectional antenna pattern. The possible delays with which signal components are received are thus detected. The phasing means 434 is thereafter directed to sweep the different direction angles with a narrow directional beam, and the measuring means are simultaneously guided to measure with the aforementioned delay values detected in the first measurement. The incoming directions $\alpha_i$ of the components that have arrived with different delays are thus obtained.

The parameters of the detected signal components are sent to channel controller 412 of the channel element 400. The channel controller allocates the digital receiver elements 400, 402 to receive and demodulate the best detected signal components by informing the receiver element of the incoming direction and delay of the signal component.

The receiver unit 400, 402 comprises monitoring means (TL) 424, 432 to which the channel controller 412 forwards the information about the phase and incoming direction of the signal component to be monitored. The monitoring means 424, 432 control the phasing means 418, 426 of the receiver unit, the input of which is the digitized signal obtained from the antenna group. The phasing means 418, 426 have a similar structure as the phasing means 434 in the searcher unit 404. On the basis of the information on the angle of arrival $\alpha_i$ that is received from the channel controller 412, the monitoring means 424, 432 sets the complex weighting coefficients $w_i$ (i=1, . . . L) in such a way that a signal arriving from the desired incoming direction is visible at the output of the phasing means 418, 426. This can thus be understood as a receiver antenna beam pointing in the desired direction and having a predetermined shape.

The receiver units 401, 402 further comprise demodulation means (DEMOD) 420, 425, the input of which comprises a signal obtained from the phasing means 418, 426. The monitoring means 424, 432 guide the demodulation means 420, 425 to synchronize with a signal component arriving with a given delay $\tau_k$. In the demodulation means 420, 425, the signal is despread and demodulated using the given $\tau_k$ as the code phase. The obtained symbols are supplied to the other parts of the channel element together with the delay data.

The receiver units 401, 402 further comprise phasing means (RBF) 422, 430, which receives a digitized signal from the antenna group. The output signal of the second phasing means 422, 430 is input to the monitoring means 424, 432. The monitoring means 424, 432 controls the operation of the second phasing means 422, 430 by measuring the current parameters $(\alpha_i, \tau_k)$ of the signal component assigned to the receiver. The monitoring means 424, 432 detects possible changes in the incoming direction and delay of the received signal component. The second phasing means 422, 430 functions similarly to the phasing means 418, 426 and also includes means similar to the measuring means 436 in the searcher unit 404 for measuring the impulse response. If the monitoring means 424, 432 detects changes in the incoming direction $\alpha_i$ or delay $\tau_k$ of the desired signal component from the second phasing means 422, 430, they update this data to the first phasing means 418, 426 and to the demodulation means 420, 425.

The monitoring means 424, 432 controls the measurements performed by the second phasing means 422, 430, so that a signal could be received with the greatest possible energy at all times. The monitoring means updates the data about the changed parameters $(\alpha_i, \tau_k)$ to the phasing means 418, 426, the demodulation means 420, 425 and also to the channel controller 412, so that the data can be used in the transmission direction.

The combiner 408 combines the symbol sequences arriving from the different receiver elements by compensating for their different delays $\tau_k$ and by weighting the different symbol sequences according to their signal-to-noise ratios, to obtain maximum ratio combination. The combined symbol sequence thus obtained is supplied to the decoder 410, which decodes the symbols into data bits. Deinterleaving may be performed before the decoding. CDMA applications generally use a strong convolutional coding for which the best method of detection is the Viterbi algorithm.

In operation of digital transmission unit 406, the user data bits are first supplied to the encoder 414, which encodes the bits with a convolutional code and performs interleaving on the encoded symbols. The obtained interleaved symbols are applied to a spread spectrum modulator (MOD) 442, which performs conventional modulation.

In the embodiment, the transmission unit 406 comprises adjustment means (BC) 444 and phasing means (TBF) 440 for controlling and phasing digitally the signal to be transmitted in response to the received signal. The adjustment means 444 receives channel element information in their input about the incoming directions used in the different receiver units 401, 402 for receiving a signal from the mobile station. The channel controller 412 may also report the other incoming directions of the signal detected by searcher unit 404, but not all the directions are necessarily used in the reception of the signal.

The adjustment means 444 controls phasing means 440, by calculating a complex weighting coefficient $w_{ij}$ (i=1, ..., L; j=1, ..., J) from beamforming function J×L which produces J antenna beams by means of L antenna elements. In addition to the direction and number of the antenna beams, the adjustment means 444 controls the phasing means 440 by indicating the transmit power that is to be used with each beam. The adjustment means 444 obtains the transmit power from the control means 412.

In phasing means 440, the digitized (I, Q) samples of the outbound signal supplied from the modulation means 442 are multiplied by the L complex weighting coefficients where L is the number of the antenna elements, as follows:

$$v_i = \sum_{j=1}^{J} g_j w_{ij}, i = 1, \dots, L$$

whereby L complex sample sequences are obtained for the antenna group. The complex multiplication also uses a real scaling factor $g_j$ (j=1, ..., J), which is obtained from the adjusting means 444 and which can be used for the independent power adjustment of each antenna beam. The adjusting means 444 also indicates the frequency to be used, so that the weighting coefficients $w_{ij}$ can be set correctly.

The arrangement according to the invention can also use special beam control bits that a mobile station generates on the basis of the signal it has received and that are included in the signal it transmits to the base station. The transceiver comprises means 416 for demultiplexing and detecting these beam control bits from the received signal. Detection of these bits is performed before decoding in decoder 410 in order to avoid delays. The beam control bits are forwarded to the adjusting means 444 of transmission unit 406. The adjustment means 444 then phases means 440 on the basis of the information obtained from the control means 412 of the channel element and the beam control bits transmitted by the mobile station. The adjustment can be performed in alternate ways by processing the parameters $\alpha_j$ and $g_j$ (j=1, ..., J) in different ways. For example, the transmit power used with some antenna beams can be independently adjusted or the direction angle $\alpha_j$ of some antenna beams can be changed by a given angle $\Delta\alpha$, or the number of the antenna beams used can be altered. With these measures it is possible to compensate for the deterioration of signal quality, such as fadings, occurring over the radio path.

In the embodiment of the invention, the adjustment means 444 of transmission unit 406 can deflect the direction of one or several of the used antenna beams by small degrees $\Delta\alpha$ in the environment of the given direction angle $\alpha_j$. Due to such deflection, it is possible to reduce the likelihood that the mobile station would be in a deep fading for a long time. Since the direction angle of an antenna beam continuously vibrates around a nominal direction angle $\alpha_j$, a signal that has propagated over the radio path does not continuously use the same route. This method can be considered a new type of antenna diversity in the downlink direction.

Further, in the arrangement according to the invention the adjustment means 444 can control phasing means 440 in such a way that a high-power signal having a wide antenna beam is obtained from the antenna group with the suitable adjustment of the weighting coefficients $w_{ij}$ (i=1, ..., L; j=1, ..., J) and the factors $g_j$ (j=1, ..., J). The obtained antenna pattern may be, for example, a sector pattern or an omnidirectional pattern. For example, a data-unmodulated pilot signal can thus be transmitted with a permanent antenna pattern that requires less processing resources as compared to a beamformed pattern. The same method can also be applied in the transmission of control channels.

Also, the adjustment means 444 can control phasing means 440 in such a way that with the suitable adjustment of the weighting coefficients $w_{ij}$ (i=1, ... L; j=1, ..., J) and the factors $g_j$ (j=1, ..., J), one or several signals having a rather narrow antenna beam are obtained from the antenna group, the angle of the greatest gain of the signal sweeping continuously the cell area. The obtained antenna pattern can be used for the transmission of a pilot signal.

In the embodiment of the invention, the transceiver of FIG. 2 may be used to provide both beamformed channels and omnidirectional channels on the forward link. Base station controller 216 controls transceiver 200 so that beamformed and omnidirectional forward link transmission channels are generated and allocated to mobile stations according to the embodiment of the invention. Base station controller 216 may also simultaneously control and divert other transceivers of the base station, depending on how the system is implemented. Base station controller 216 may be implemented in an appropriate combination of hardware and software in order to perform these functions.

Figure 5:
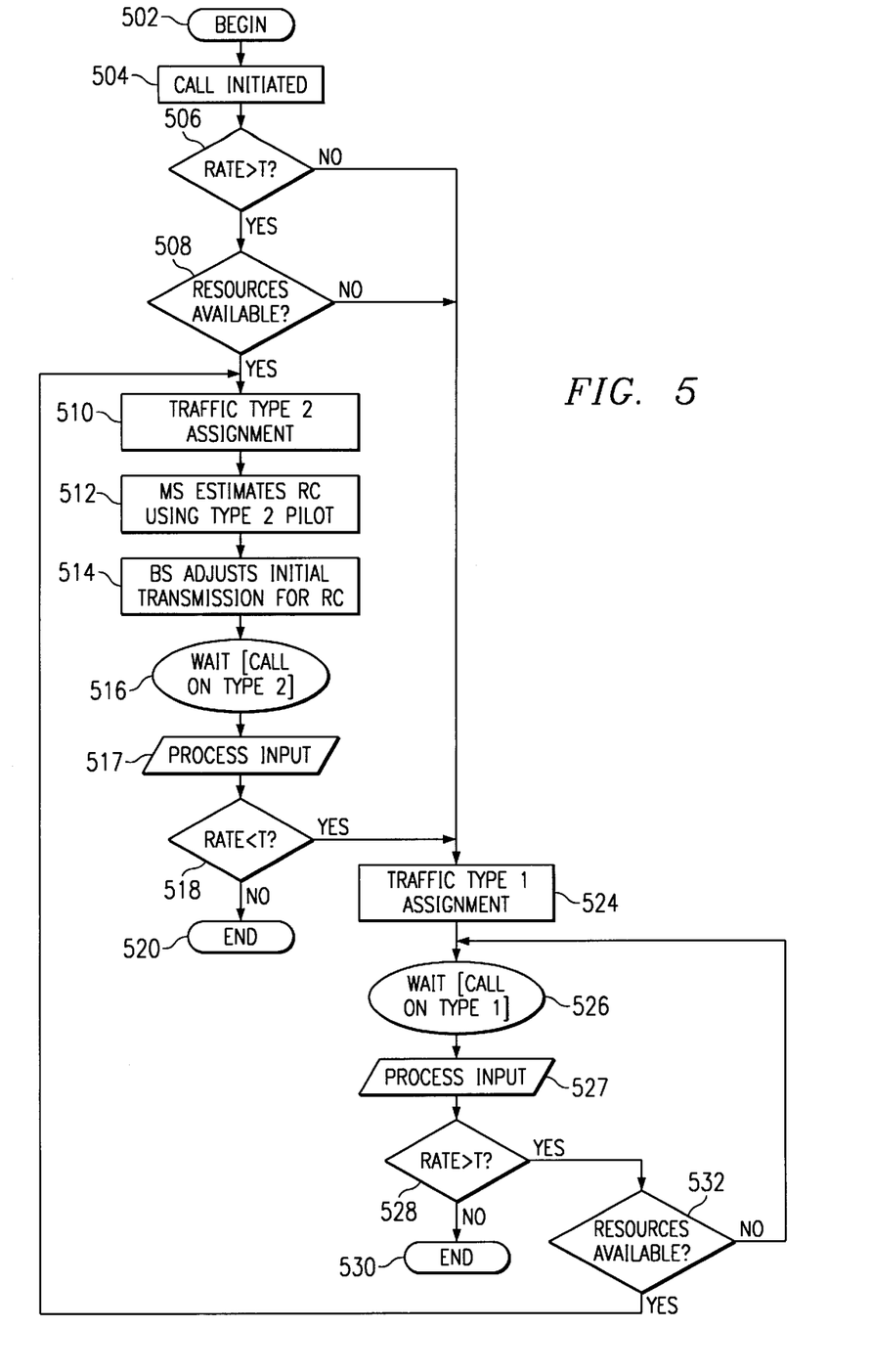
FIG. 5 is a flow diagram illustrating process steps performed when controlling forward link transmissions according to an embodiment of the invention.

Referring now to FIG. 5, therein is a flow diagram illustrating process steps performed when controlling forward link transmissions according to the embodiment of the invention. FIG. 5 shows the process for a call between a mobile station and base station, such as mobile station 102 and base station 100 of FIG. 1. FIG. 5 will be described with reference to FIG. 1.

The process begins at step 502, where mobile station 102 is monitoring the paging channel of base station 100. The paging channel is transmit using transmission pattern 110. At step 504, a call is initiated. The call initiation may be made from mobile station 102 or base station 100. Next, at step 506, base station controller 216 determines whether an initial data rate of this call on the forward link is greater than a threshold value T. If the initial data rate is greater than T, the process will move to step 508. At step 508, base station controller 216 determines whether system resources are available for implementing a beamformed traffic channel for the call. If it is determined that resources are available, the process moves to step 510 for assignment of a traffic channel transmit from a beamformed antenna (traffic type 2). If, however, at either step 506 or 508 a determination is made that the initial data rate is less than T or resources are not available, the process moves to step 524 for assignment of a traffic channel transmit from an omnidirectional antenna (traffic type 1).

At step 510, base station controller 216 configures transceiver 200 for beamformed transmission to mobile station 102 and initiates transmission of a traffic type 2 channel assignment message from base station 100. At step 512, after receiving the channel assignment message, mobile station 102 tunes to the auxiliary pilot channel (pilot type 2) associated with the assigned traffic type 1 channel and performs channel estimation. Mobile station 102 also transmits data including the channel estimation information to base station 100. At step 514, base station 100 then transmits the initial transmission on the assigned traffic type 2 channel according to the estimation.

The process moves to the wait state of step 516 as the call is carried on the traffic type 2 channel. The process stays in the wait state until a process input is received at step 517. The process input may receive two types of inputs-one indicating that the call is over and one indicating that the data rate has decreased to less than T. Next, at step 518, it is determined if the process input indicates that the data rate has decreased to less than T. If it is determined that the process input indicates the data rate has decreased to less than T, the process moves to step 524; otherwise, the process moves to step 520 and ends. At step 524, base station controller 216 configures transceiver 200 for omnidirectional transmission to mobile station 102 and initiates transmission of a traffic type 1 channel assignment message to mobile station 102. The process then moves to the wait state of step 526 as the call is carried on the traffic type 1 channel. The process stays in the wait state of step 526 until a process input is received at step 527. Next, at step 528, it is determined if the process input indicates that the data rate has increased to greater than or equal to the threshold T. If it is determined that the data rate has increased to greater than or equal to the threshold T, the process moves to step 532; otherwise, the process moves to step 530 and ends.

At step 532, base station controller 216 determines whether resources are available for implementing an auxiliary traffic channel for the call. If it is determined that resources are available, the process moves to step 510. If, however, at step 532 it is determined that system resources are not available, the process moves back to the wait state of 526, where the call continues on the traffic type 1 channel. A flag is set in the memory of base station controller 216 when the process moves from step 532 to step 526 or from step 508 to step 524. This flag can initiate a periodic data rate input at step 527 as long as the data rate remains greater than T. This allows a periodic recheck to determine if enough resources have become available for a type 2 traffic channel to be implemented for the mobile station.

Figure 6:
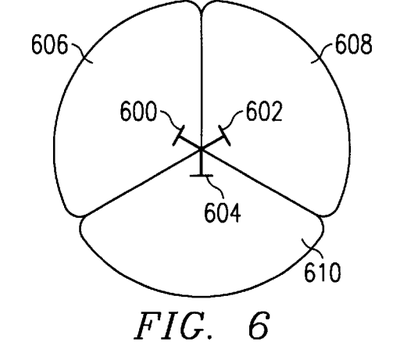
FIG. 6 illustrates sectorized transmission patterns that are omnidirectional with a 120 degree sector of a cell.

Although described in the context of particular embodiments, it should be realized that a number of modifications to these teachings may occur to one skilled in the art. By example, antennas with angular span less than the normal omnidirectional antenna (i.e., spanning 120 degree for 3 cell sectorization), may be used in place of one or more of the omnidirectional antennas as the non-beamforming antennas. FIG. 6 illustrates an example of sectorized transmission patterns that are omnidirectional within a 120 degree sector of a cell. Antennas 600, 602 and 604 transmit transmission patterns 606, 608 and 610, respectively, to provide covering nearly equivalent to that of transmission pattern 110 of FIG. 1. Transmission patterns 606, 608 and 610 may be used to provide the control and traffic channels of the non-beamforming antennas. Thus, while the invention has been particularly shown and described with respect to preferred embodiments thereof, it will be understood by those skilled in the art that changes in form and scope may be made therein without departing from the scope and spirit of invention.

What is claimed is:

1. A method for operating a cellular system having a base station transmitting over beamformed channels from beamforming antennas and non-beamformed channels from non-beamforming antennas, said method comprising the steps of:

receiving a request for access from a mobile station on a non-beamformed access channel;

determining, in response to receiving said request for access, whether said mobile station is to be assigned to a beamformed traffic channel or to a non-beamformed traffic channel based on at least one system parameter, the at least one system parameter including an indication of availability of system resources for use for said beamformed channels;

and if it is determined that said mobile station is to be assigned to said beamformed channel;

determining information at said mobile station from a beamformed pilot channel; and transmitting from said base station to said mobile station on said beamformed traffic channel according to said information.

2. The method of claim 1, wherein said step of determining whether said mobile station is to be assigned to a beamformed traffic channel or to a non-beamformed traffic channel comprises determining whether a data rate of a transmission from said base station to said mobile station on said non-beamformed traffic channel would exceed a predetermined level.

3. The method of claim 2, wherein said non-beamformed traffic channel comprises a first non-beamformed traffic channel and wherein said method further comprises the steps of:

determining that said mobile station is to be transferred from said beamformed traffic channel to a second non-beamformed traffic channel based on said at least one system parameter; and assigning said mobile station to said second non-beamformed traffic channel.

4. The method of claim 3, wherein said step of determining that said mobile station is to be transferred from said beamformed traffic channel comprises determining that said data rate of a transmission from said base station to mobile station on said beamformed traffic channel has fallen below said predetermined level.

5. The method of claim 1, wherein said information determined from said beamformed pilot channel in said step of determining information comprises timing information.

6. The method of claim 1, wherein said beamformed pilot channel comprises a CDMA pilot channel and said beamformed traffic channel comprises a CDMA traffic channel transmitted on the same antenna.

7. A method of operating a cellular system having a base station transmitting on beamforming and non-beamforming antennas, said method comprising the steps of:

transmitting a first control message on a first control channel from said base station to a mobile station, said first control channel transmitted from a non-beamforming antenna of said base station;

demodulating, in response to receiving said first control message, a first traffic channel at said mobile station, said first traffic channel transmitted from said non-beamforming antennas of said base station;

determining that said mobile station is to be transferred from said first traffic channel to a second traffic channel based on at least one system parameter, the at least one system parameter including an indication of availability of system resources for use of said beamforming antennas, said second traffic channel transmitted from a first beamforming antenna of said beamforming antennas of said base station;

transmitting, in response to said determination made in said step of determining, a second control message on said first traffic channel, said second control message identifying a second control channel associated with said second traffic channel;

demodulating, in response to receiving said second control message at said mobile station, said second control channel;

transmitting channel data from said mobile station to said base station, said channel data determined from said second control channel;

transmitting a transmission on said second traffic channel from said base station to said mobile station according to said channel data; and demodulating said transmission on said second traffic channel at said mobile station.

8. The method of claim 7, wherein said step of determining that said mobile station is to be transferred from said first traffic channel comprises determining that a data rate of a transmission from said base station to said mobile station on said first traffic channel has exceeded a predetermined level.

9. The method of claim 8, further comprising the steps of:

determining that said mobile station should be transferred from said second traffic channel to a third traffic channel, said third traffic channel transmitted from a non-beamforming antenna of said base station;

transmitting a third control message to said mobile station on said second traffic channel; and demodulating said third traffic channel at said mobile station.

10. The method of claim 9, wherein said step of determining that said mobile station should be transferred from said second traffic channel comprises determining that a data rate of a transmission from said base station to said mobile station on said second traffic channel has fallen below said predetermined level.

11. The method of claim 7, wherein said second control channel comprises a CDMA pilot channel and said second traffic channel comprises a CDMA traffic channel transmitted on the same antenna.

12. The method of claim 7, wherein said first control channel and first traffic channel are CDMA channels transmitted from omnidirectional antennas.

13. The method of claim 7, wherein said channel data determined from said second control channel comprises timing information.

14. An apparatus for operating a cellular system having a base station transmitting over beamformed channels from beamforming antennas and over non-beamformed channels from non-beamforming antennas, said apparatus comprising:

means for receiving a request for access from a mobile station on a non-beamformed access channel;

means for determining, in response to receiving said request for access, whether said mobile station is to be assigned to a beamformed traffic channel or to a non-beamformed traffic channel based on at least one system parameter, the at least one system parameter including an indication of availability of system resources for use for of beamformed channels;

means for determining, in response to a determination that said mobile station is to be assigned to a beamformed traffic channel in said means for determining whether said mobile station is to be assigned to a beamformed traffic channel, information at said mobile station from a beamformed pilot channel; and means for transmitting from said base station to said mobile station on said beamformed traffic channel based on said information determined in said means for determining information.

15. The apparatus of claim 14, wherein said means for determining whether said mobile station is to be assigned to a beamformed traffic channel or to a non-beamformed traffic channel comprises means for determining whether a data rate of a transmission from said base station to said mobile station on said non-beamformed channel would exceed a predetermined level.

16. The apparatus of claim 15, wherein said non-beamformed traffic channel comprises a first non-beamformed traffic channel and wherein said apparatus further comprises:

means for determining that said mobile station is to be transferred from said beamformed traffic channel to a second non-beamformed traffic channel based on said at least one system parameter; and means for assigning said mobile station to said second non-beamformed traffic channel.

17. The apparatus of claim 16, wherein said means for determining that said mobile station is to be transferred from said beamformed traffic channel comprises means for determining that a data rate of a transmission from said base station to mobile station on said beamformed traffic channel has fallen below said predetermined level.

18. The apparatus of claim 14, wherein said information determined from said beamformed pilot channel by said means for determining information comprises timing information.

19. The apparatus of claim 14, wherein said beamformed pilot channel comprises a CDMA pilot channel and said beamformed traffic channel comprises a CDMA traffic channel transmitted on the same antenna.

20. An apparatus for operating a cellular system having a base station transmitting on beamforming and non-beamforming antennas, said apparatus comprising:

means for transmitting a first control message on a first control channel from said base station to a mobile station, said first control channel transmitted from a non-beamforming antenna of said base station;

means for demodulating, in response to receiving said first control message, a first traffic channel at said mobile station, said first traffic channel transmitted from said non-beamforming antenna of said base station;

means for determining that said mobile station is to be transferred from said first traffic channel to a second traffic channel based on at least one system parameter, said second traffic channel transmitted from a first beamforming antenna of said base station, said at least one system parameter including an indication of system resources for use of said beamforming antennas;

means for transmitting, in response to said determination made in said means for determining, a second control message on said first traffic channel, said second control message identifying a second control channel associated with said second traffic channel;

means for demodulating, in response to receiving said second control message at said mobile station, said second control channel;

means for transmitting channel data from said mobile station to said base station, said channel data determined from said second control channel;

means for transmitting a transmission on said second traffic channel from said base station to said mobile station according to said channel data; and means for demodulating said transmission on said second traffic channel at said mobile station.

21. The apparatus of claim 20, wherein said means for determining that said mobile station is to be transferred from said first traffic channel comprises means for determining that a data rate of a transmission from said base station to said mobile station on said first traffic channel has exceeded a predetermined level.

22. The apparatus of claim 21, further comprising:

means for determining that said mobile station should be transferred from said second traffic channel to a third traffic channel, said traffic channel transmitted from a non-beamforming antenna of said base station;

means for transmitting a third control message to said mobile station on said second traffic channel; and means for demodulating said first traffic channel at said mobile station.

23. The apparatus of claim 22, wherein said means for determining that said mobile station should be transferred from said second traffic channel comprises means for determining that a data rate of a transmission from said base station to said mobile station on said second traffic channel has fallen below said predetermined level.

24. The apparatus of claim 20, wherein said second control channel comprises a CDMA pilot channel and said second traffic channel comprises a CDMA traffic channel transmitted on the same antenna.

25. The apparatus of claim 20, wherein said first control channel and first traffic channel are CDMA channels transmitted from omnidirectional antennas.

26. The apparatus of claim 20, wherein said channel data determined from said second control channel by said means for determining comprises timing information.

* * * * *